(12) United States Patent
Horiuchi (10) Patent No.: US 8,469,071 B2
(45) Date of Patent: Jun. 25, 2013

(54) RUN FLAT TIRE

(75) Inventor: Kenji Horiuchi, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 98 days.

(21) Appl. No.: 13/247,929

(22) Filed: Sep. 28, 2011

(65) Prior Publication Data
US 2012/0073718 A1 Mar. 29, 2012

(30) Foreign Application Priority Data

Sep. 29, 2010 (JP) ................. 2010-218539

(51) Int. Cl.
*B60C 17/00* (2006.01)
*B60C 17/08* (2006.01)
*B60C 15/00* (2006.01)

(52) U.S. Cl.
USPC ..................... 152/516; 152/517; 152/539

(58) Field of Classification Search
USPC ................... 152/516, 517, 518, 519, 520
See application file for complete search history.

(56) References Cited

U.S. PATENT DOCUMENTS
2010/0147439 A1  6/2010 Koeune et al.

FOREIGN PATENT DOCUMENTS

| JP | 07-304312 | | 11/1995 |
|---|---|---|---|
| JP | 2007-069774 | | 3/2007 |
| JP | 2007-168540 | * | 7/2007 |
| JP | 2007-216752 | * | 8/2007 |
| JP | 2008-94347 | * | 4/2008 |
| JP | 2009-061866 | | 3/2009 |
| JP | 2010-137853 | | 6/2010 |
| JP | 2011-57068 | * | 3/2011 |

OTHER PUBLICATIONS

Japanese Patent Office, Decision of a Patent Grant, Aug. 21, 2012, 4 pages, Japan.

* cited by examiner

*Primary Examiner* — Justin Fischer
(74) *Attorney, Agent, or Firm* — Thorpe North & Western LLP (57) ABSTRACT

A run flat tire in which the maximum tire width position when the tire is in an inflated state, the inclination angle formed by the line S' tangent to the tire outer wall in the tire shoulder region, the curving form of the tread surface, the relationship between the thickness Ga of the outer side rubber taken on a line X normal to the rim line and centered on the carcass layer 5 and the maximum thickness Gb of the outer side rubber in an upper region of the bead portion 2, the relationship of the thickness Gc of the inner side rubber taken on a line X normal to the rim line and centered on the carcass layer 5 and the thickness Ga of the outer side rubber are each stipulated.

18 Claims, 4 Drawing Sheets

RUN FLAT TIRE

PRIORITY CLAIM

Priority is claimed to Japan Patent Application Serial No. 2010-218539 filed on Sep. 29, 2010.

BACKGROUND

1. Technical Field

The present technology relates to a run flat tire, and particularly relates to a run flat tire configured so as to have both durability when run-flat traveling and riding comfort when regular traveling.

2. Related Art

Generally, in run flat tires provided with a side reinforcing layer having a falcated cross-section on an inner surface side of a side wall portion, methods such as increasing a thickness of the side reinforcing layer and using a rubber with a high hardness have been used in order to ensure durability when run-flat traveling. However, when only these sorts of technologies are applied there are problems in that the degree of excellent run flat durability that can be ensured is limited and riding comfort when regular traveling is significantly worsened due to the increase in side wall stiffness.

Particularly, when the tire cross-sectional height reaches a certain height, breakdowns when run-flat traveling consist mainly of breakdowns in the vicinity of the rim cushion near the bead portion. Therefore, there is a demand for technology that prevents such breakdowns and, simultaneously, ensures excellent riding comfort.

Conventionally, technology has been proposed to solve this problem wherein a mitigating rubber layer is disposed in the vicinity of a rim line on an outer side, in a tire axial direction, of a folded up portion of a carcass layer, wherein, when a side wall portion buckles, the mitigating rubber layer exerts a mitigating action, with respect to the upthrust by a rim flange, between the carcass folded up edge portion and the rim flange in order to prevent rupturing in that area (e.g. see Japanese Unexamined Patent Application No. H07-304312A). Additionally, technology has been proposed wherein a folded up end of a carcass layer is distanced from a region where it contacts a rim flange top edge portion in order to suppress the generation and/or expansion of cracking due to the concentration of stress in the vicinity of the folded up end of the carcass layer (e.g. see Japanese Unexamined Patent Application Publication No. 2009-61866A).

However, both of these proposals are limited as to effectiveness in enhancing run-flat durability, and, at the same time, do not directly lead to improvements in the effectiveness of enhancing riding comfort when regular traveling. Therefore, neither provides technology that can sufficiently satisfy the demand for both run-flat durability and riding comfort.

SUMMARY

The present technology provides a run flat tire configured so as to have high levels of both durability when run-flat traveling and riding comfort when regular traveling. A run flat tire includes at least one layer of a carcass layer provided around bead cores embedded in a left-right pair of bead portions and folded over from a tire inner side toward a tire outer side so as to envelop bead fillers that are disposed on an outer circumferential side of the bead cores. A plurality of belt layers is disposed on an inner circumferential side of a tread portion, a belt cover layer formed from organic fiber cords is disposed on the outer circumferential side of the belt layers, and a side reinforcing layer having a falcated cross-section is disposed between the carcass layer and an inner liner layer in a side wall portion. In the run flat tire described above, a relationship between a tire cross-sectional height SHi on an inner side in the tire radial direction and a tire cross-sectional height SHo on an outer side in the tire radial direction, demarcated by a maximum tire width position when the run flat tire is assembled on a JATMA regulation standard rim and inflated to an air pressure of 180 kPa, is $0.7 < SHi/SHo < 0.9$. Furthermore, an intersection P of a line tangent to an intersection S of a straight line Q in a tire axial direction passing through a midpoint of the tire cross-sectional height SHo and a tire outer wall and an external tire diameter line Z is positioned more to a tire equatorial plane side than a region R that corresponds to 90% of a rim width HRW of the standard rim having the tire equatorial plane as a center. Moreover, an angle $\alpha$ of a straight line connecting, in the tread surface, a point O on the tire equatorial plane and a point R' on a shoulder side corresponding to 110% of a tire ground contact width TW having the tire equatorial plane as a center, with respect to the tire axial direction, is from 7.5 to 10°. Additionally, the outer peripheral edge of the bead filler is positioned more to the inner side in the tire radial direction than a line normal to a rim line on an outer wall surface of the bead portion. When Ga is a rubber thickness taken on a line normal to the rim line between the carcass layer and an outer wall surface of the side wall portion, and Gb is a maximum rubber thickness taken on a line normal to the carcass layer between the carcass layer and the outer wall surface of the side wall portion, a relationship between Ga and Gb is $0.65\ Gb < Ga < 0.85\ Gb$. When Gc is a rubber thickness taken on a line normal to the rim line between the carcass layer and a tire inner wall surface, a relationship between Gc and Ga is $0.85\ Ga < Gc < 1.00\ Ga$.

Furthermore, the configuration described above is preferably configured as described in (1) to (6) below.

(1) A relationship between the tire ground contact width TW and a tire maximum width SW is $0.65 < TW/SW < 0.75$.

(2) A folded over end of the carcass layer is configured so as to be positioned in a range of within 5 mm of both sides along the carcass layer, demarcated by a point on the carcass layer where the rubber thickness between the carcass layer and the outer wall surface of the side wall portion reaches a maximum.

(3) The folded over end of the carcass layer is configured so as to extend to an inner side of the belt layer in a first of the side wall portions. In this case, the side wall portion having the folded over end of the carcass layer extended to the inner side of the belt layer is preferably provided on a vehicle inner side of a tire when a wheel is provided with a negative camber angle or a wheel is not provided with a camber angle; and on a vehicle outer side of a tire when a wheel is provided with a positive camber angle.

(4) A second carcass layer is disposed having an edge portion on a tire inner wall surface side of the bead filler along an outer peripheral surface of the carcass layer, and having an end between the outer peripheral surface of the bead core and an outer peripheral edge of the bead filler.

(5) The side reinforcing layer having a falcated cross-section is formed from an inner side rubber and an outer side rubber that are connected in the tire radial direction. The inner side rubber of the rubber forming the side reinforcing layer has a higher JIS-A hardness than that of the outer side rubber. In this case, the outer side rubber of the rubber forming the side reinforcing layer preferably has a lower tan $\delta$ at 60° C. than that of the inner side rubber.

(6) The belt cover layer is composed of a composite fiber cord that is formed by twisting together a low elasticity yarn and a high elasticity yarn having differing elastic moduli.

According to the present technology, a relationship between a tire cross-sectional height SHi on an inner side in the tire radial direction and a tire cross-sectional height SHo on an outer side in the tire radial direction, demarcated by a maximum tire width position when the run flat tire inflated to a certain air pressure, is configured to be within a given range. Moreover, an intersection P of a line tangent to an intersection S of a straight line Q in a tire axial direction passing through a midpoint of the tire cross-sectional height SHo and a tire outer wall and an external tire diameter line Z is positioned more to a tire equatorial plane side than a region R that corresponds to 90% of a rim width HRW of the standard rim having the tire equatorial plane as a center. Furthermore, an angle $\alpha$ of a straight line connecting, in the tread surface, a point O on the tire equatorial plane and a point R' on a shoulder side corresponding to 110% of a tire ground contact width TW having the tire equatorial plane as a center, with respect to the tire axial direction, is from 7.5 to 10°. Therefore, the maximum tire width position is positioned on the bead portion side, the angle of the tire outer wall at the intersection S is set gradually in the tire axial direction, and a cross-sectional shape of the tread surface is formed into a curved surface. As a result of the synergy achieved therefrom, even if the inflated air pressure declines, buckling of the tread portion can be prevented and excellent durability can be ensured while enhancing riding comfort when regular traveling to a high level.

Moreover, the outer peripheral edge of the bead filler is positioned more to the inward side in the tire radial direction than the line normal to the rim line. Therefore, the outer peripheral edge of the bead filler is distanced from the region prone to being subjected to the large amount of stress caused by contact pressure with the rim when run-flat traveling. Thus, shearing stress acting on the end of the bead filler can be suppressed and run-flat durability can be enhanced due to separation of the rubber in the vicinity of this area being suppressed.

Additionally, the relationship between the rubber thickness Ga, taken on the line normal to the rim line between the carcass layer and the outer wall surface of the side wall portion, and the maximum rubber thickness Gb, taken on the line normal to the carcass layer between the second carcass layer and the outer wall surface of the side wall portion, is set within a predetermined range; and a ratio of variation in the rubber thickness in the tire radial direction on the outer side of the carcass layer is restricted. As a result, localized, concentrated stress caused by contact pressure with the rim is mitigated, which leads to separation breakdowns of the rubber in the vicinity of the rim cushion being suppressed when run-flat traveling. At the same time, rubber thickness in the upper region of the bead portion being ensured, and therefore, riding comfort when regular traveling can be enhanced.

Furthermore, a large rubber thickness Gc taken on the line X normal to the rim line between the carcass layer and the tire inner wall surface is ensured, and the rubber thickness Gc is set so as to be close to the rubber thickness Ga described above. As a result, it is possible to mitigate shearing stress acting between main body side and the folded over side of the carcass layer, which leads to separation breakdowns therebetween being suppressed. Particularly, durability when run-flat traveling can be enhanced, and, at the same time, riding comfort when regular traveling can be enhanced due to rubber thickness being maintained in regions where great deformation occurs due to input from the rim.

DETAILED DESCRIPTION

Detailed descriptions will be given below of a configuration of the present technology with reference to the accompanying drawings.

Figure 1:
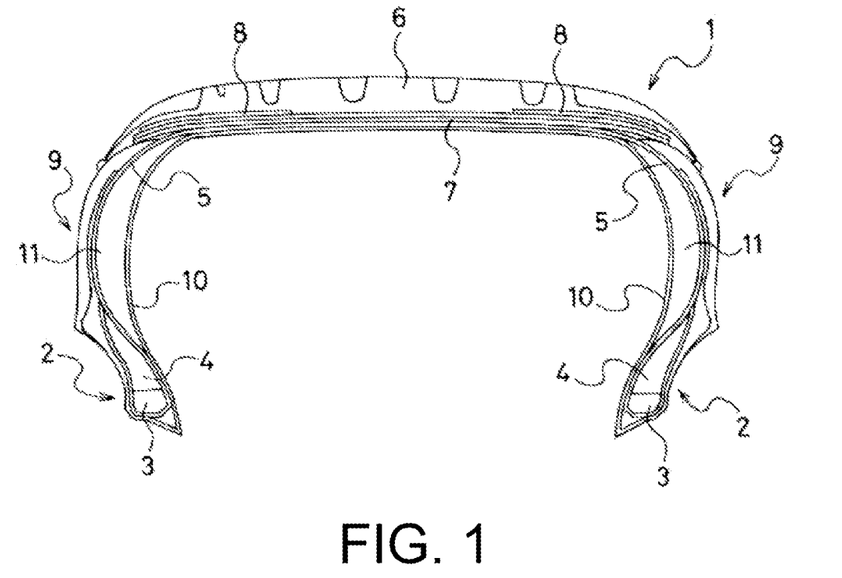
FIG. 1 is a cross-sectional view illustrating a construction of a run flat tire having a form in which a side reinforcing layer is disposed on an inner surface side of a side wall portion.

FIG. 1 is a cross-sectional view illustrating a construction of a run flat tire having a form in which a side reinforcing layer is disposed on an inner surface side of a side wall portion.

In FIG. 1, a run flat tire 1 includes at least one layer of a carcass layer 5 provided around bead cores 3,3 embedded in a left-right pair of bead portions 2,2 and folded over from a tire inner side toward a tire outer side so as to envelop bead fillers 4,4 that are disposed on an outer circumferential side of the bead cores 3,3, wherein a plurality of belt layers 7 are disposed on an inner circumferential side of a tread portion 6, a belt cover layer 8 is disposed on the outer circumferential side of the belt layers 7, and a side reinforcing layer 11 having a falcated cross-section is disposed between the carcass layer 5 and an inner liner layer 10 of side wall portions 9,9.

Figure 2:
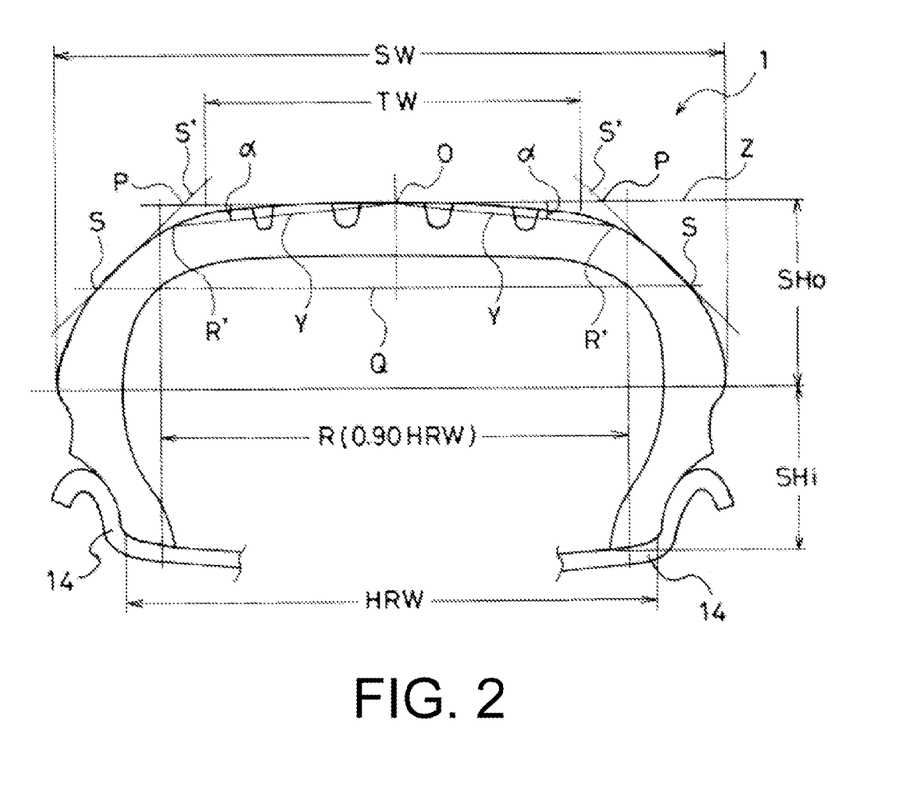
FIG. 2 is a cross-sectional view illustrating an outer wall shape of the run flat tire according to an embodiment of the present technology.

As illustrated in FIG. 2, in the present technology, a relationship between a tire cross-sectional height on an inner side in the tire radial direction SHi and a tire cross-sectional height on an outer side in the tire radial direction SHo, demarcated by a maximum tire width position when the run flat tire 1 is assembled on a JATMA regulation standard rim 14 and inflated to an air pressure of 180 kPa, is configured so as to be 0.7<SHi/SHo<0.9.

Furthermore, an intersection P of a line S' tangent to an intersection S of a straight line Q in a tire axial direction passing through a midpoint of the tire cross-sectional height SHo and a tire outer wall and an external tire diameter line Z is positioned more to a tire equatorial plane side than a region R that corresponds to 90% of a rim width HRW of the standard rim 14 having the tire equatorial plane as a center. Furthermore, an angle $\alpha$ of a straight line Y connecting, in the tread surface, a point O on the tire equatorial plane and a point R' on a shoulder side corresponding to 110% of a tire ground contact width TW having the tire equatorial plane as a center, with respect to the tire axial direction, is configured to be from 7.5 to 10°, and preferably from 8.0 to 9.5°.

Therefore, the maximum tire width position is positioned on the bead portion 2 side, the angle of the tire outer wall at the intersection S is set gradually in the tire axial direction, and a cross-sectional shape of the tread surface is formed into a curved surface. As a result of the synergy achieved therefrom, even if the inflated air pressure declines, buckling of the tread portion can be prevented and excellent durability can be ensured while enhancing riding comfort when regular traveling to a high level.

In the present technology, "tire ground contact width TW" refers to a maximum linear distance in the tire width direction of a contact surface formed with a flat plate when, after the tire 1 is assembled on a standard rim 14, filled to an air pressure corresponding to a maximum load capacity defined by JATMA and placed perpendicularly on the flat plate in a motionless state, a load corresponding to 80% of the maximum load capacity is applied.

Figure 3:
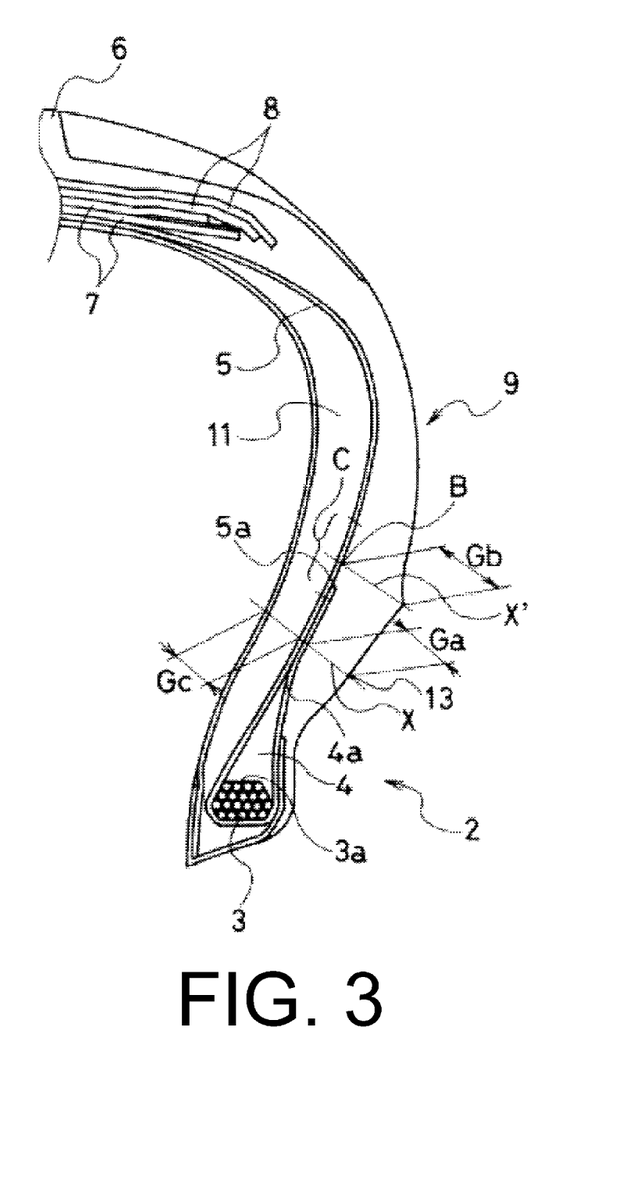
FIG. 3 is a cross-sectional view illustrating an enlarged example of an internal structure of the side wall portion of the run flat tire according to the embodiment of the present technology.

Furthermore, as illustrated in FIG. 3, in the present technology, when Ga is a rubber thickness taken on the line X normal to the rim line 13 between the carcass layer 5 and an outer wall surface of a side wall portion 9, and Gb is a maximum rubber thickness taken on a line normal to the carcass layer 5, a relationship between Ga and Gb is configured so as to be 0.65 Gb<Ga<0.85 Gb, and preferably 0.70 Gb<Ga<0.80 Gb. Note that in FIG. 3, the normal line at the position where the rubber thickness between the carcass layer 5 and the outer wall surface of the side wall portion 9 is at a maximum on the line normal to the carcass layer 5 is indicated as X'.

Thus, a ratio of variation in the rubber thickness in the tire radial direction on the outer side of the carcass layer 5 described above is restricted. As a result, localized, concentrated stress caused by contact pressure with the rim 14 is mitigated, which leads to separation breakdowns of the rubber in the vicinity of the rim cushion when run-flat traveling being suppressed. Therefore, run-flat durability can be enhanced and, at the same time, riding comfort when regular traveling can be improved due to the rubber thickness in the upper region of the bead portion 2 being ensured.

Here, if the rubber thickness Ga taken on the line X normal to the rim line 13 is set so as to be 0.85 times or more of the maximum rubber thickness Gb taken along the line normal to the carcass layer 5, the form of the carcass line will not be maintainable and/or a gross volume of the rubber will become excessively large, leading to the durability being inhibited. Note that "rim line 13" described above refers to a thin line extending in a tire circumferential direction that is provided on the outer wall surface of the bead portion 2 so that the interlocked state of the tire and the rim can be externally determinable.

Furthermore, when Gc is a rubber thickness taken on the line X normal to the rim line 13 between the carcass layer 5 and the tire inner wall surface, a relationship between Gc and Ga is configured so as to be 0.85 Ga<Gc<1.00 Ga, and preferably 0.90 Ga<Gc<0.95 Ga.

The rubber thickness Gc is set so as to be close to the rubber thickness Ga as described above. As a result, it is possible to mitigate shearing stress acting between main body side and the folded over side of the carcass layer 5, which leads to separation breakdowns therebetween being suppressed. Particularly, durability when run-flat traveling can be enhanced, and, at the same time, riding comfort when regular traveling can be enhanced due to rubber thickness being maintained in regions where great deformation occurs due to input from the rim 14.

Here, if the rubber thickness Gc on the tire inner wall surface side taken on the line X normal to the rim line 13 is set so as to be greater than or equal to the rubber thickness Ga, the form of the carcass line will not be maintainable and/or a gross volume of the rubber will become excessively large, leading to the durability being inhibited.

In the present technology, a relationship between the tire ground contact width TW and the tire maximum width SW is preferably configured so as to be 0.65<TW/SW<0.75. Thereby, it is possible to have a higher level of both durability when run-flat traveling and riding comfort when regular traveling.

In the present technology, a folded over end 5a of the carcass layer 5 is more preferably configured so as to be positioned in a range (indicated as "C" in the figures) of within 5 mm of both sides along the carcass layer 5, demarcated by a point B where the rubber thickness between the carcass layer 5 and the outer wall surface of the side wall portion 9 reaches a maximum.

Thereby, separation breakdowns in the vicinity of the folded over end 5a of the carcass layer 5 can be suppressed and run-flat durability can be reliably enhanced.

Additionally, with the run flat tire 1 of the present technology, the folded over end 5a of the carcass layer 5 can be extended to the inner side of an edge portion of the belt layers 7 in a first of the side wall portions 9. Here, an overlapping width of the edge portion of the carcass layer 5 and the edge portion of the belt layers 7 is not particularly limited, but is preferably configured so as to be not less than 5 mm or, not less than 5% of a maximum belt width.

Thereby, the side wall stiffness is increased and, at the same time, the folded over end 5a will be positioned on the inner side of the edge portion of the belt layers 7 where comparatively little deformation occurs when traveling. Therefore, breakdowns due to separation and cracking in the vicinity of the folded over end 5a are efficiently suppressed and run-flat durability can be enhanced.

In this case, the side wall portion 9 having the folded over end 5a of the carcass layer 5 extended to the inner side of the edge portion of the belt layers 7 is preferably provided on a vehicle inner side of a tire when a wheel is provided with a negative camber angle or a wheel is not provided with a camber angle; and on a vehicle outer side of a tire when a wheel is provided with a positive camber angle. Thereby, the load bearing functionality of the side wall portion 9 on the side having increased side wall stiffness is enhanced. Therefore, excellent steering stability can be ensured when run flat traveling and, of course, regular traveling and, at the same time, excellent run-flat durability can be ensured due to the suppression of breakdowns due to cracking in the vicinity of the folded over end 5a.

Figure 4:
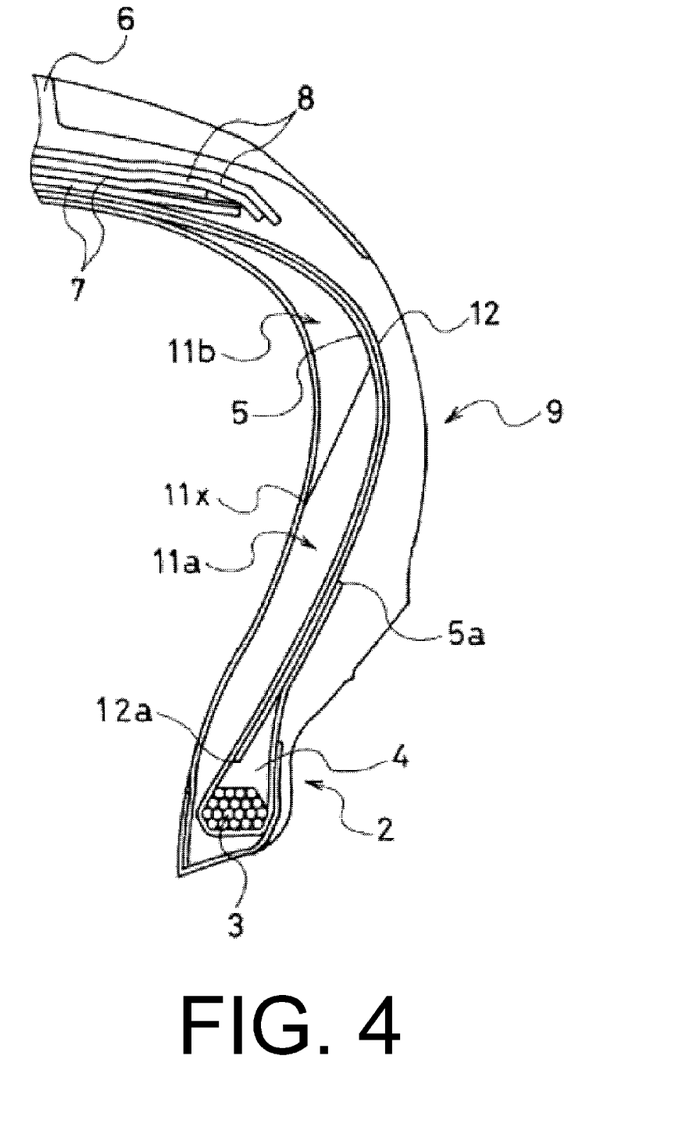
FIG. 4 is a cross-sectional view illustrating another enlarged example of an internal structure of the side wall portion of the run flat tire according to the embodiment of the present technology.

As illustrated in FIG. 4, in the present technology a second carcass layer 12 is preferably disposed having an edge portion on a tire inner wall surface side of the bead filler 4 along an outer peripheral surface of the carcass layer 5 and having an end 12a between the outer peripheral surface 3a of the bead core 3 and an outer peripheral edge 4a of the bead filler 4.

Thus, the second carcass layer 12 having the end 12a that does not reach the outer peripheral surface 3a of the bead core 3 is disposed along the outer peripheral surface of the carcass layer 5. Therefore, the second carcass layer 12, which is freed from shearing strain caused by tension applied to the carcass layer 5, enhances the stiffness of a crown portion. This results in excellent steering stability and riding comfort being displayed when regular traveling and also makes possible the enhancing of run flat durability by suppressing buckling of the tread portion 6 when run-flat traveling.

In the present technology, as illustrated in FIG. 4, the side reinforcing layer 11 described above is more preferably formed from an inner side rubber 11a and an outer side rubber 11b that are connected in the tire radial direction, and the inner side rubber 11a of the rubber forming the side reinforcing layer 11 preferably has a higher JIS-A hardness than that of the outer side rubber 11b. Thereby, a soft rubber is disposed on the tread portion 6 side, resulting in the rubber in the vicinity of the shoulder being deformable, which leads to a reduction in the stress received from the rim 14 and makes possible the further enhancement of riding comfort when regular traveling.

In this case, as illustrated in FIG. 4, a demarcation face between the inner side rubber 11a and the outer side rubber 11b is more preferably formed as a face inclining from the outer side toward the inner side in the tire radial direction from the tire outer side to the tire inner side. Additionally, an end 11x of the demarcation face on the inner side in the tire radial direction is preferably positioned more to the outer side in the tire radial direction than the point B where the rubber thickness between the carcass layer 5 and the outer wall surface of the side wall portion 9 reaches a maximum, illustrated in FIG. 3. Thereby, heat generation in the side reinforcing layer 11 when run-flat traveling can be effectively suppressed.

In this case, the outer side rubber 11b of the rubber forming the side reinforcing layer 11 more preferably has a lower tan δ at 60° C. than that of the inner side rubber 11a. Thereby, heat generation in the soft rubber on the tread portion 6 side can be suppressed and durability can be enhanced.

In the present technology, the belt cover layer 8 more preferably is composed of a composite fiber cord that is formed by twisting together a low elasticity yarn and a high elasticity yarn having different elastic moduli. By using the composite fiber cord, which is formed by twisting a low elasticity yarn and a high elasticity yarn together, as the belt cover layer 8, the drawbacks of low elasticity fiber cords (recoverability of distortions being difficult to obtain due to high heat generation), and the drawbacks of high elasticity cords (slightly problematic compression fatigue and adhesiveness) can be mutually compensated for.

Moreover, by appropriately selecting the type and physical properties of the composite fiber cord, stiffness in the crown portion is ensured, which leads to excellent steering stability and riding comfort being displayed when regular traveling and also makes possible the enhancing of run flat durability by suppressing buckling of the tread portion 6 when run-flat traveling.

As described above, with the run flat tire of the present technology, the maximum tire width position when the tire is in an inflated state, the inclination angle formed by the line tangent to the tire outer wall in the tire shoulder region, the curving form of the tread surface, the relationship between the thickness of the outer side rubber taken on a line normal to the rim line and centered on the carcass layer and the maximum thickness of the outer side rubber in an upper region of the bead portion, the relationship of the thickness of the inner side rubber taken on a line normal to the rim line and centered on the carcass layer and the thickness of the outer side rubber are each stipulated. Thereby, input from road surfaces can be efficiently mitigated and, simultaneously, localized, concentrated stress caused by contact pressure with the rim is avoided, which leads to enhancements in both run flat durability and riding comfort when regular traveling. Therefore, the run flat tire of the present technology can be widely applied as a run flat tire for mounting on modern, high-performance vehicles.

EXAMPLES

A conventional tire (Conventional Example), present technology tires (Working Examples 1 to 4, and 6), and comparative tires (Comparative Examples 1 and 2) were manufactured having a common tire size of 245/45R17. The position of the intersection P with respect to the line of demarcation in the region R that corresponds to 90% of the rim width HRW ("Intersection P position" in Table 1), the angle α of a straight line Y with respect to the tire axial direction, the distance from a normal line X of a bead filler outer peripheral edge 4a, a ratio of the rubber thickness Ga with respect to the rubber thickness Gb, a ratio of the rubber thickness Gc with respect to the rubber thickness Ga, the position of the folded over end 5a of the carcass layer 5, the presence/absence of the second carcass layer 12, the rubber hardness of the side reinforcing layer 11, and the material of the belt cover layer 8 were each varied as shown in Table 1.

Note that in each of the tires, rayon fiber cord was used for each of the carcass layer 5 and the second carcass layer 12, steel cord was used for the belt layers 7,7, and the ratio of the tire cross-sectional height SHi on the inner side in the tire radial direction to the tire cross-sectional height SHo on the outer side in the tire radial direction for each tire was configured so as to be 0.85.

These eight types of tires were each mounted on the front and rear wheels of a front-engine front-wheel drive (FF) vehicle (negative camber angle: 2°) having an engine displacement of 1,800 cc. Run-flat durability and riding comfort were evaluated via the test methods described below.

Note that in Table 1, Working Example 4 is an example in which the position of the folded over end 5a of the carcass layer 5 is extended to below the end of the belt and the side wall portion 9 is provided on the vehicle outer side; and Working Examples 5 and 6 are examples in which the position of the folded over end 5a of the carcass layer is extended to below the end of the belt and the side wall portion 9 is provided on the vehicle inner side.

Run-Flat Durability

Each tire was assembled on a rim (size: 17×8.0 J) and inflated to an air pressure of 230 kPa. The valve core of the right side drive axle tire (one of the four tires) was removed and the vehicle was run on an asphalt road surface test course at an average speed of 80 km/h. Running was continued until the driver felt vibration caused by the breakdown of the tire. Run-flat durability was evaluated based on the average running distance. Three experienced test drivers performed this evaluation and the results were averaged and recorded in Table 1 as index values with the value of the conventional tire being 100. Larger index values indicate superior run-flat durability.

Riding Comfort

Each tire was assembled on a rim (size: 17×8.0 J) and inflated to an air pressure of 230 kPa. The vehicle was run on a dry asphalt road surface test course at an average speed of 80 km/h and three experienced test drivers performed a sensory evaluation. The results of the evaluations were tallied on a 5-point scoring scale with the score of the conventional tire being 3, and the average score thereof was recorded in Table 1. Larger index values indicate superior riding comfort.

TABLE 1

|  | C.E. | W. E. 1 | W. E. 2 | W. E. 3 | W. E. 4 | W. E. 5 | W. E. 6 |
|---|---|---|---|---|---|---|---|
| Intersection P position | Shoulder side | Equator side | Equator side | Equator side | Equator side | Equator side | Equator side |
| Angle α of straight line Y with respect to the tire axial direction (°) | 6.5 | 9.0 | 9.0 | 9.0 | 9.0 | 9.0 | 9.0 |

TABLE 1-continued

| | | | | | | | | |
|---|---|---|---|---|---|---|---|---|
| Distance from normal line X of bead filler outer peripheral edge 4a | | 5 mm to the upper side | 10 mm to the lower side | 10 mm to the lower side | 10 mm to the lower side | 10 mm to the lower side | 10 mm to the lower side | 10 mm to the lower side |
| Ratio of rubber thickness Ga with respect to rubber thickness Gb | | 0.5 Gb | 0.75 Gb | 0.75 Gb | 0.75 Gb | 0.75 Gb | 0.75 Gb | 0.75 Gb |
| Ratio of rubber thickness Gc with respect to rubber thickness Ga | | 0.5 Ga | 0.90 Ga | 0.90 Ga | 0.90 Ga | 0.90 Ga | 0.90 Ga | 0.90 Ga |
| Position of folded over end 5a of carcass layer 5 | First side wall portion 9 | 45 mm under B | 3 mm under B | 3 mm under B | 3 mm under B | 3 mm under B | 3 mm under B | 3 mm under B |
| | Second side wall portion 9 | 45 mm under B | 3 mm under B | 3 mm under B | 3 mm under B | Under end of belt | Under end of belt | Under end of belt |
| Presence/absence of second carcass layer 12 | | No | Yes | No | Yes | Yes | Yes | Yes |
| JIS-A rubber hardness of side reinforcing layer 11 | Inner side rubber 11a | 80 | 80 | 80 | 85 | 85 | 85 | 85 |
| | Outer side rubber 11b | 80 | 80 | 80 | 75 | 75 | 75 | 75 |
| Material of belt cover layers 8, 8 | | Nylon fiber | Nylon fiber | Nylon fiber | Nylon fiber | Nylon fiber | Nylon fiber | Composite fiber |
| Evaluation Results | Run-flat durability | 100 | 107 | 105 | 108 | 109 | 110 | 111 |
| | Riding comfort | 3 | 4.0 | 4.0 | 4.7 | 4.7 | 4.7 | 5.0 |

| | | Comparative Example 1 | Comparative Example 2 |
|---|---|---|---|
| Intersection P position | | Shoulder side | Shoulder side |
| Angle α of straight line Y with respect to the tire axial direction (°) | | 6.5 | 6.5 |
| Distance from normal line X of bead filler outer peripheral edge 4a | | 5 mm to the upper side | 10 mm to the lower side |
| Ratio of rubber thickness Ga with respect to rubber thickness Gb | | 0.5 Gb | 0.5 Gb |
| Ratio of rubber thickness Gc with respect to rubber thickness Ga | | 0.5 Ga | 0.5 Ga |
| Position of folded over end 5a of carcass layer 5 | First side wall portion 9 | 45 mm under B | 45 mm under B |
| | Second side wall portion 9 | 45 mm under B | 45 mm under B |
| Presence/absence of second carcass layer 12 | | Yes | Yes |
| JIS-A rubber hardness of side reinforcing layer 11 | Inner side rubber 11a | 80 | 80 |
| | Outer side rubber 11b | 80 | 80 |
| Material of belt cover layers 8, 8 | | Nylon fiber | Nylon fiber |
| Evaluation Results | Run-flat durability | 101 | 99 |
| | Riding comfort | 2.7 | 3.0 |

Notes to Table 1:
As used in Table 1, "C.E." is an abbreviation for "Conventional Example" and "W.E." is an abbreviation for "Working Example".

It is clear from Table 1 that compared to the tires of the Conventional Example and the Comparative Examples, the tires of the Working Examples of the present technology enhance run-flat durability and riding comfort in a well-balanced manner.

What is claimed is:

1. A run flat tire comprising at least one layer of a carcass layer provided around bead cores embedded in a left-right pair of bead portions and folded over from a tire inner side toward a tire outer side so as to envelop bead fillers that are disposed on an outer circumferential side of the bead cores, wherein a plurality of belt layers is disposed on an inner circumferential side of a tread portion, a belt cover layer formed from organic fiber cords is disposed on the outer circumferential side of the belt layers, and a side reinforcing layer having a falcated cross-section is disposed between the carcass layer and an inner liner layer in a side wall portion; wherein a relationship between a tire cross-sectional height SHi on an inner side in the tire radial direction and a tire cross-sectional height SHo on an outer side in the tire radial direction, demarcated by a maximum tire width position when the run flat tire is assembled on a JATMA regulation standard rim and inflated to an air pressure of 180 kPa, is 0.7<SHi/SHo<0.9;

an intersection P of
- a line tangent to an intersection S of a straight line Q in a tire axial direction passing through a midpoint of the tire cross-sectional height SHo and a tire outer wall and
- an external tire diameter line Z is positioned more to a tire equatorial plane side than a region R that corresponds to 90% of a rim width HRW of the standard rim having the tire equatorial plane as a center;
- an angle α of a straight line connecting, in the tread surface, a point O on the tire equatorial plane and a point R' on a shoulder side corresponding to 110% of a tire ground contact width TW having the tire equatorial plane as a center, with respect to the tire axial direction, is from 7.5 to 10°;
- the outer peripheral edge of the bead filler is positioned more to the inner side in the tire radial direction than a line normal to a rim line on an outer wall surface of the bead portion;
- when Ga is a rubber thickness taken on a line normal to the rim line between the carcass layer and an outer wall surface of the side wall portion, and Gb is a maximum rubber thickness taken on a line normal to the carcass layer between the carcass layer and the outer wall surface of the side wall portion, a relationship between Ga and Gb is 0.65 Gb<Ga<0.85 Gb; and
- when Gc is a rubber thickness taken on a line normal to the rim line between the carcass layer and a tire inner wall surface, a relationship between Gc and Ga is 0.85 Ga<Gc<1.00 Ga.

2. The run flat tire according to claim 1, wherein a relationship between the tire ground contact width TW and a tire maximum width SW is 0.65<TW/SW<0.75.

3. The run flat tire according to claim 1, wherein a folded over end of the carcass layer is configured so as to be positioned in a range of within 5 mm of both sides along the carcass layer, demarcated by a point on the carcass layer where the rubber thickness between the carcass layer and the outer wall surface of the side wall portion reaches a maximum.

4. The run flat tire according to claim 1, wherein a folded over end of the carcass layer is configured so as to extend to an inner side of the belt layers in a first of the side wall portions.

5. The run flat tire according to claim 4, wherein the side wall portion having the folded over end of the carcass layer extended to the inner side of the belt layers is provided on a vehicle inner side of a tire when a wheel is provided with a negative camber angle or a wheel is not provided with a camber angle; and on a vehicle outer side when a wheel is provided with a positive camber angle.

6. The run flat tire according to claim 1, wherein a second carcass layer is disposed having an edge portion on a tire inner wall surface side of the bead filler along an outer peripheral surface of the carcass layer and having an end between the outer peripheral surface of the bead core and an outer peripheral edge of the bead filler.

7. The run flat tire according to claim 1, wherein the side reinforcing layer having a falcated cross-section is formed from an inner side rubber and an outer side rubber that are connected in the tire radial direction, and the inner side rubber of the rubber forming the side reinforcing layer has a higher JIS-A hardness than that of the outer side rubber.

8. The run flat tire according to claim 7, wherein the outer side rubber of the rubber forming the side reinforcing layer has a lower tan δ at 60° C. than that of the inner side rubber.

9. The run flat tire according to claim 1, wherein the belt cover layer is composed of a composite fiber cord that is formed by twisting together a low elasticity yarn and a high elasticity yarn having differing elastic moduli.

10. The run flat tire according to claim 1, wherein the angle α of the straight line connecting, in the tread surface, the point O on the tire equatorial plane and the point R' on the shoulder side corresponding to 110% of the tire ground contact width TW having the tire equatorial plane as the center, with respect to the tire axial direction, is from 8.0 to 9.5°.

11. The run flat tire according to claim 1, wherein the relationship between Ga and Gb is 0.70 Gb<Ga<0.80 Gb.

12. The run flat tire according to claim 1, wherein the relationship between Gc and Ga is 0.90 Ga<Gc<0.95 Ga.

13. The run flat tire according to claim 1, wherein a folded over end of the carcass layer is extended to the inner side of the edge of the belt layers in a first of the side wall portions, and an overlapping width of the edge portion of the carcass layer and the edge portion of the belt layers is configured so as to be not less than 5 mm.

14. The run flat tire according to claim 1, wherein a folded over end of the carcass layer is extended to the inner side of the edge of the belt layers in a first of the side wall portions, and an overlapping width of the edge portion of the carcass layer and the edge portion of the belt layers is configured so as to be not less than 5% of a maximum belt width.

15. The run flat tire according to claim 1, wherein the side reinforcing layer is formed from an inner side rubber and an outer side rubber that are connected in the tire radial direction, the inner side rubber of the rubber forming the side reinforcing layer has a higher JIS-A hardness than that of the outer side rubber, and wherein a demarcation face between the inner side rubber and the outer side rubber is formed as a face inclining from the outer side toward the inner side in the tire radial direction from the tire outer side to the tire inner side, and an end of the demarcation face on the inner side in the tire radial direction is positioned more to the outer side in the tire radial direction than the point where the rubber thickness between the carcass layer and the outer wall surface of the side wall portion reaches a maximum.

16. The run flat tire according to claim 1, wherein:
- a relationship between the tire ground contact width TW and a tire maximum width SW is 0.65<TW/SW<0.75;
- a folded over end of the carcass layer is configured so as to be positioned in a range of within 5 mm of both sides along the carcass layer, demarcated by a point on the carcass layer where the rubber thickness between the carcass layer and the outer wall surface of the side wall portion reaches a maximum; and
- a folded over end of the carcass layer is configured so as to extend to an inner side of an edge portion of the belt layers in a first of the side wall portions.

17. The run flat tire according to claim 16, wherein:
- the side wall portion having the folded over end of the carcass layer extended to the inner side of the edge portion the belt layers is provided on a vehicle inner side of a tire when a wheel is provided with a negative camber angle or a wheel is not provided with a camber angle; and on a vehicle outer side when a wheel is provided with a positive camber angle; and
- a second carcass layer is disposed having an edge portion on a tire inner wall surface side of the bead filler along an outer peripheral surface of the carcass layer and having an end between the outer peripheral surface of the bead core and an outer peripheral edge of the bead filler.

18. The run flat tire according to claim 1, wherein:
- the side reinforcing layer having a falcated cross-section is formed from an inner side rubber and an outer side rubber that are connected in the tire radial direction, and the inner side rubber of the rubber forming the side reinforcing layer has a higher JIS-A hardness than that of the outer side rubber;

the outer side rubber of the rubber forming the side reinforcing layer has a lower tan δ at 60° C. than that of the inner side rubber; and the belt cover layer is composed of a composite fiber cord that is formed by twisting together a low elasticity yarn and a high elasticity yarn having differing elastic moduli.

* * * * *